Patented Feb. 22, 1949

2,462,221

UNITED STATES PATENT OFFICE 2,462,221

PROCESS FOR THE PRODUCTION OF ACETARYLAMIDES

Edgar Stagg Pemberton, Banstead, England, assignor to British Industrial Solvents, Limited, London, England, a British company No Drawing. Application September 10, 1946, Serial No. 696,041. In Great Britain September 20, 1945

7 Claims. (Cl. 260—562)

This invention is for improvements in or relating to the production of acetarylamides and has for an object to provide a process which is, inter alia, valuable for the preparation of acetanilide.

Numerous methods have, in the past, been employed for the preparation of acetanilide, but the method which has herefore been used on the large scale generally consists in heating a mixture of aniline and acetic acid (the latter being in considerable excess e. g. 50% to 60% excess over the stoichiometrical amount) and slowly distilling off dilute acetic acid. The water in the distillate arises from the dehydration of the aniline acetate to acetanilide, and the concentrations of the acetic acid in the initial and final distillates vary between 20% and 70% by volume. Yields are stated to be of the order of 96–98% of the theoretical based on the aniline in the charge.

It has also been proposed to manufacture acetanilide and p-acet-toluidide by heating the corresponding amides with acetic anhydride, the anhydride being present in less than equimolecular proportions. The dilute acetic acid resulting from the reaction is distilled off, whereupon a further quantity of acetic anhydride is added to the reaction mixture and the process repeated until the acetylation is completed. This process obviously has the disadvantage, besides requiring the use of acetic anhydride, which is an expensive substance, that the distillation of dilute acetic acid formed during the reaction and the subsequent addition of fresh acetic anhydride with avoidance of overheating due to the exothermic reaction leads to as many interruptions of the manufacturing procedure.

According to the present invention, there is provided a process for the production of acetarylamides comprising heating acetic acid with an arylamine in the presence of a volatile entrainer, such as benzene, and distilling off the water of reaction in the form of a binary mixture with the entrainer. By the process of this invention it is possible to carry out the acetylation of aniline more rapidly and with a much smaller quantity of acetic acid than has hitherto been employed; a 20% excess of acetic acid over the stoichiometrical amount is, for example, satisfactory. Further, at least 75% by weight of this excess acid can be recovered in the form of anhydrous acetic acid for reuse. This means that about 95% by weight of the acetic acid charged into the reactor is recovered either in the form of acetanilide or as anhydrous acetic acid.

The quantity of benzene that is required to carry out the process of my invention is dependent on the capacity of the fractionating column but is however, relatively small and may, for example, be as low as 2% to 3% by weight of the total reaction mixture.

The production of acetanilide, for example, may be carried out by charging into the reaction vessel (preferably fitted with an efficient fractionating column) a mixture of the whole of the aniline, benzene and acetic acid required for the process and heating the mixture until evaporation of the benzene-water binary mixture begins. I prefer to add the whole of the acetic acid at the commencement of the operation rather than to add the acid gradually throughout the reaction as the latter process involves a considerable lengthening of the time required to bring the reaction to completion.

As the reaction proceeds, the benzene-water vapour distilling off through the fractionating column is condensed and is allowed to separate into two layers, the upper layer of benzene being returned to the reaction vessel or column. When no more water distils off, the residual benzene is finally distilled off and excess acetic acid recovered from the reaction vessel by distillation, preferably under vacuum. Any tendency to decomposition of the product is thereby avoided.

Catalysts may be employed in the reaction if desired, but I have found that the reaction proceeds satisfactorily in their absence.

The reaction may be carried out at a liquid temperature above 100° C., depending on the quantity of benzene present; I prefer to add sufficient benzene such that the initial boiling temperature is about 130° to 140° C. As the reaction proceeds towards completion it is necessary to raise the temperature to between 150–200° C.

After the removal of water is completed the excess benzene is recovered by distillation, preferably at substantially atmospheric pressure. In this way the loss of benzene is cut down to a minimum. As previously stated, the acetic acid recovery is preferably conducted under reduced pressure e. g. at a pressure of 110–130 mm. of mercury; at this pressure, the boiling point of the acetanilide is about 30° C. above that employed for stripping off the benzene at atmospheric pressure so that a heating system suitable for acetylation and benzene stripping would suffice for the stripping of the acetic acid. Thus a grade of acetanilide suitable for sale can be made in one vessel with a minimum amount of handling. The product obtained in the above manner is suitable for most industrial purposes. The molten anilide may be run off on to a flaking device; it is characterised by an acidity below 0.1% by weight (reckoned as acetic acid). By the process of my invention it is easily possible to obtain a product which is completely neutral in reaction. Any further purification required may be effected, for example, by vacuum distillation.

The following examples illustrate the manner in which the invention may be carried into effect:

*Example 1.*—Into a flask fitted with a 13-section Young and Thomas evaporation column was charged 7 mols. of aniline together with acetic acid (21.2% by weight in excess of that theoretically required) and benzene equal to 5.4% of the weight of the total aniline—acetic acid mixture. The liquid reaction temperature was varied between 156° C. and 170° C. during the distillation of the benzene-water mixture, whilst the acetic acid recovery took place up to a liquid temperature of about 240° C. under 110–130 mms. pressure. The reaction was complete in 20¼ hours and a product having an acidity of 0.07% (as acetic acid) was obtained in 99.6% yield based on the aniline. The anilide has a melting point of 113.5° C. In this example all the acetic acid was fed into the refluxing benzene-aniline mixture.

*Example 2.*—In a further experiment conducted with 21.0% by weight excess of the theoretically required amount of acetic acid and only 2.7% by weight of benzene (reckoned as in Example 1), the reaction was conducted at a temperature of 132°–188° C. whilst the stripping of the acetic acid took place up to a liquid temperature of 230° C. at 100 mms. pressure. The product, which was obtained in 99.7% yield based on the aniline, was neutral in reaction and melted at 113.5° C. In this experiment 70% by weight of the acetic acid was fed in initially, the remainder being fed in as the reaction proceeded. The reaction was completed in 8 hours.

*Example 3.*—In a further experiment all the reactants, containing 22.4% by weight excess of the theoretically required amount of acetic acid and 2.7% by weight of benzene (reckoned as in Example 1), were mixed in initially, the reaction being conducted at a temperature of 133°–195° C., whilst the stripping of the acetic acid took place at 100 mm. of mercury pressure. The product, obtained in 99% yield, based on the aniline, was neutral and melted at 114° C. Eight hours sufficed for the completion of the reaction.

*Example 4.*—428 gms. of o-toluidine (4 mols.) were mixed with 288 gms. of glacial acetic acid (4 mols. plus 20% excess) and 30 gms. of benzene (4.2% by weight reckoned as in Example 1) and kept for 9.5 hours at a temperature of 137° C. gradually raising it to 232° C. whilst the benzene-water mixture is distilled off and acetic acid recovered as described in the foregoing examples. The yield of o-acet-toluidide based on the o-toluidine is 99.3%; on the acetic acid 96.4%. The melting point of the product obtained is between 103° C. and 106.5° C.

*Example 5.*—428 gms. of m-toluidine were mixed with 283 gms. of acetic acid (4 mols. plus 18% excess) and 43 gms. of benzene (4.9% by weight reckoned as in Example 1). The temperature range was from 130° C. to 214° C. The reaction was completed in 7.5 hours. The yield based on toluidine was 99.3%; based on acetic acid it was 96.5%. The product melted at 63–64° C.

Although the above examples show the production of acetanilide and the acet-toluidides, it is to be understood that this invention is not limited thereto but includes the reaction of acetic acid with other arylamines, for example, the xylidines. Nor is the choice of entrainer limited to benzene; other volatile diluents capable of entraining water, such as toluene, the lower alkyl acetates or chlorinated aliphatic hydrocarbons may be employed.

Matter disclosed but not claimed herein is disclosed and claimed in my copending applications, Ser. Nos. 71,029 and 71,030, each filed January 14, 1949.

What I claim is:

1. A process for the production of acetarylamides which comprises heating an arylamine with an excess of acetic acid not exceeding about 20% by weight of the amount theoretically required in the presence of an amount of a volatile entrainer not exceeding about 5% by weight of the reaction mixture, said volatile entrainer being selected from the group consisting of benzene and toluene, effecting reaction at temperatures between 130° C. and about 200° C. whilst distilling off from the reaction mixture the water of reaction in the form of a binary mixture with said entrainer, condensing the distillate, separating the said entrainer therefrom, returning separated entrainer to the reaction mixture and finally distilling off the said entrainer by distillation under substantially atmospheric pressure and distilling off excess of unreacted acetic acid under subatmospheric pressure.

2. A process according to claim 1 wherein a part only of the required amount of acetic acid is added to the initial reaction mixture and the remainder thereof is added as the reaction proceeds.

3. A process according to claim 1 wherein the initial reaction temperature is between about 130° to 140° C. and the final reaction temperature is between about 150° and 200° C.

4. A process for the production of acetanilide which comprises heating aniline with an excess of acetic acid not exceeding about 20% by weight of the stoichiometrically required amount in the presence of a volatile diluent selected from the group consisting of benzene and toluene in an amount not exceeding about 5% by weight of the reaction mixture, effecting the reaction at temperatures between about 130° C. and 200° C. whilst distilling off the produced water as a binary mixture with said volatile diluent, separating said diluent from entrained water and returning said separated diluent to the reaction mixture and finally distilling off the diluent by distilling under substantially atmospheric pressure and distilling off unreacted acetic acid from the acetanilide under a pressure of 110 to 130 mms.

5. A process for the production of acetanilide which comprises heating aniline with about a 20% by weight excess of acetic acid in the presence of benzene in an amount not exceeding about 5% by weight of the reaction mixture, effecting the reaction at temperatures between about 130° C. and 200° C. whilst distilling off the produced water as a binary mixture with said benzene, separating said benzene from entrained water and returning said separated benzene to the reaction mixture and finally distilling off the benzene by distillation under substantially atmospheric pressure and distilling off unreacted acetic acid from the acetanilide under a pressure of 110 to 130 mms.

6. A process for the production of acet-toluidide which comprises heating toluidine with about a 20% by weight excess of acetic acid in the presence of benzene in an amount not exceeding about 5% by weight of the reaction mixture, effecting the reaction at temperatures between about 130° C. and 200° C. whilst distilling off the produced water as a binary mixture with said benzene, separating said benzene from entrained water and returning said separated benzene to the reaction mixture and finally distilling off the benzene by distillation under substantially atmospheric pressure and distilling off unreacted acetic acid from the acettoluidide under a pressure of 110 to 130 mms.

7. A process according to claim 1 wherein said volatile entrainer is toluene.

EDGAR STAGG PEMBERTON.

REFERENCES CITED

The following references are of record in the file of this patent.

UNITED STATES PATENTS

| Number | Name | Date |
|---|---|---|
| 615,829 | Fehrlin | Dec. 13, 1898 |
| 2,076,111 | Bannister | Apr. 6, 1937 |

OTHER REFERENCES

Guinot et al., "Trans. Inst. Chem. Eng.," vol. 16, pp. 189–198 (1938).